United States Patent
Huggins et al.

(10) Patent No.: US 6,722,668 B2
(45) Date of Patent: Apr. 20, 2004

(54) CHUCK HAVING QUICK CHANGE MECHANISM

(75) Inventors: Mark S. Huggins, Clemson, SC (US); Stephen W. Steadings, Seneca, SC (US); Daijiro Nakamura, Hyougo Prefecture (JP)

(73) Assignee: Power Tool Holders Incorporated, Christiana, DE (US)

( * ) Notice: Subject to any disclaimer, the term of this patent is extended or adjusted under 35 U.S.C. 154(b) by 0 days.

(21) Appl. No.: 10/357,789

(22) Filed: Feb. 4, 2003

(65) Prior Publication Data

US 2003/0111804 A1 Jun. 19, 2003

Related U.S. Application Data

(63) Continuation of application No. 09/783,698, filed on Feb. 14, 2001, now Pat. No. 6,533,291.

(51) Int. Cl.[7] .............................................. B23B 31/12
(52) U.S. Cl. ........................... 279/29; 279/14; 279/61; 279/62; 279/137; 279/902
(58) Field of Search ....................... 279/24, 29, 37, 279/14, 60–62, 76–78, 82, 137, 902, 904, 906; 403/16, 322.4

(56) References Cited

U.S. PATENT DOCUMENTS

| | | | |
|---|---|---|---|
| 549,837 A | 11/1895 | Weir | |
| 553,531 A | 1/1896 | Long | |
| 813,864 A * | 2/1906 | Coit | 279/61 |
| 911,012 A | 1/1909 | Jacobs | |
| 1,138,465 A | 5/1915 | Fegley et al. | |
| 1,195,214 A | 8/1916 | Hapgood | |
| 1,209,572 A | 12/1916 | Fegley | |
| 1,509,061 A | 9/1924 | Hardwicke | |
| 1,653,762 A | 12/1927 | Fegley et al. | |
| 1,705,275 A | 3/1929 | Neudeck | |
| 2,027,486 A | 1/1936 | Lapointe | 279/74 |
| 2,158,728 A | 5/1939 | Peters | 279/102 |
| 2,279,310 A | 4/1942 | Grey | 279/78 |
| 2,336,095 A | 12/1943 | Heding | 279/79 |
| 2,543,290 A | 2/1951 | Johansson | 279/75 |
| 2,806,706 A | 9/1957 | Fitch | 279/79 |
| 2,807,473 A | 9/1957 | Kiehne | 279/82 |
| 2,890,072 A | 6/1959 | Kaman et al. | 287/53 |
| 2,926,020 A | 2/1960 | Dayton et al. | 279/75 |
| 3,219,355 A | 11/1965 | Fujinuma | 279/75 |
| 3,251,605 A | 5/1966 | Ondeck | 279/82 |
| 3,260,541 A | 7/1966 | Sadler et al. | 287/53 |
| 3,367,727 A | 2/1968 | Ward et al. | 306/28 |
| 3,398,965 A | 8/1968 | Cox | 279/30 |
| 3,521,895 A | 7/1970 | Smith | 279/22 |
| 3,529,842 A | 9/1970 | Benjamin et al. | 279/30 |
| 3,549,160 A | 12/1970 | Etzkorn | 279/97 |
| 3,582,097 A | 6/1971 | Elliott, Jr. | 279/61 |
| 3,583,715 A | 6/1971 | Jahri | 279/75 |
| 3,599,996 A | 8/1971 | Holt | 279/1 B |

(List continued on next page.)

FOREIGN PATENT DOCUMENTS

| | | |
|---|---|---|
| GB | 705764 | 3/1954 |
| GB | 2065001 | 6/1981 |
| WO | WO 00/71287 | 11/2000 |

*Primary Examiner*—Daniel W. Howell
(74) *Attorney, Agent, or Firm*—Nelson Mullins Riley & Scarborough, LLP

(57) ABSTRACT

A chuck includes a driver disposed on a chuck body and in engagement with the jaws so that at least one of rotation and axial movement of the driver with respect to the body opens or closes the jaws. A first detent is disposed in the body in communication with the jaws. At least one of the jaws defines a catch at a predetermined position so that the catch engages the first detent when the jaws are at a predetermined position on the body with respect to a chuck bore.

18 Claims, 5 Drawing Sheets

U.S. PATENT DOCUMENTS

| | | | | |
|---|---|---|---|---|
| 3,658,351 | A | 4/1972 | Benjamin et al. | 279/1 B |
| 3,693,484 | A | 9/1972 | Sanderson, Jr. | 81/90 C |
| 3,707,303 | A | 12/1972 | Petri | 287/20.3 |
| 3,726,533 | A | 4/1973 | Lafferty, Sr. | 279/97 |
| 3,734,516 | A | 5/1973 | Smith | 279/75 |
| 3,735,993 | A | 5/1973 | Seibert | 279/1 B |
| 3,767,218 | A | 10/1973 | Linthicum et al. | 279/75 |
| 3,861,693 | A | 1/1975 | Huber | 279/61 |
| 3,893,677 | A | 7/1975 | Smith | 279/75 |
| 3,924,493 | A | 12/1975 | Penner | 81/177 G |
| 3,929,343 | A | 12/1975 | Wanner et al. | 279/1 B |
| 3,945,653 | A | 3/1976 | Falchle | 279/97 |
| 4,002,347 | A | 1/1977 | Wanner et al. | 279/19.3 |
| 4,041,729 | A | 8/1977 | Bilz | 64/29 |
| 4,107,949 | A | 8/1978 | Wanner et al. | 64/9 A |
| 4,131,165 | A | 12/1978 | Wanner et al. | 173/48 |
| 4,174,648 | A | 11/1979 | Wallis | 83/698 |
| 4,184,692 | A | 1/1980 | Benson et al. | 279/75 |
| 4,209,182 | A | 6/1980 | Sheldon | 279/75 |
| 4,231,581 | A | 11/1980 | Benedict | 279/19.4 |
| 4,234,277 | A | 11/1980 | Benson et al. | 408/226 |
| 4,287,923 | A | 9/1981 | Hornung | 81/429 |
| 4,290,617 | A | 9/1981 | Yoshida | 279/75 |
| 4,309,042 | A | 1/1982 | Fauth et al. | 279/75 |
| 4,349,929 | A | 9/1982 | Dewey | 7/158 |
| 4,378,053 | A | 3/1983 | Simpson | 173/13 |
| 4,390,311 | A | 6/1983 | Kuhlmann | 409/232 |
| 4,407,615 | A | 10/1983 | Kuhlmann | 408/239 A |
| RE31,755 | E | 12/1984 | Wanner et al. | 494/167 |
| 4,491,444 | A | 1/1985 | Rumpp et al. | 409/234 |
| 4,573,839 | A | 3/1986 | Finnegan | 408/239 R |
| 4,594,036 | A | 6/1986 | Hogenhout | 408/240 |
| 4,626,152 | A | 12/1986 | Palm | 409/232 |
| 4,629,375 | A | 12/1986 | Lieser | 408/239 R |
| 4,644,831 | A | 2/1987 | Yang | 81/125 |
| 4,688,975 | A | 8/1987 | Palm | 409/232 |
| 4,692,073 | A | 9/1987 | Martindell | 408/239 A |
| 4,726,270 | A | 2/1988 | Lucas | 83/13 |
| 4,740,122 | A | 4/1988 | Glaser | 409/232 |
| 4,775,159 | A | * 10/1988 | Manschitz | 279/62 |
| 4,775,269 | A | 10/1988 | Brix | 408/239 R |
| 4,787,278 | A | 11/1988 | Bononi | 81/438 |
| 4,824,298 | A | 4/1989 | Lippacher et al. | 408/240 |
| 4,848,779 | A | 7/1989 | Wheeler et al. | 279/60 |
| 4,858,939 | A | 8/1989 | Riggs | 279/75 |
| 4,900,202 | A | 2/1990 | Wienhold | 408/240 |
| 4,934,226 | A | 6/1990 | Dacey, Jr. | 81/125 |
| 4,960,344 | A | 10/1990 | Geisthoff et al. | 403/316 |
| 5,011,344 | A | 4/1991 | Johnson | 408/240 |
| 5,013,194 | A | 5/1991 | Wienhold | 408/240 |
| 5,016,892 | A | 5/1991 | Lafforgue et al. | 279/82 |
| 5,028,057 | A | 7/1991 | Wanner | 279/19.3 |
| 5,062,749 | A | 11/1991 | Sheets | 408/240 |
| 5,076,371 | A | 12/1991 | Obermeier et al. | 173/104 |
| 5,188,378 | A | 2/1993 | Erlenkeuser | 279/22 |
| 5,199,833 | A | 4/1993 | Fehrle et al. | 408/239 R |
| 5,346,453 | A | 9/1994 | Rivera-Bottzeck | 483/1 |
| 5,348,317 | A | 9/1994 | Steadings et al. | 279/62 |
| 5,348,318 | A | 9/1994 | Steadings et al. | 279/62 |
| 5,354,075 | A | 10/1994 | Marik et al. | 279/72 |
| 5,398,946 | A | 3/1995 | Quiring | 279/30 |
| 5,417,527 | A | 5/1995 | Wienhold | 408/239 R |
| 5,437,465 | A | 8/1995 | Vogele et al. | 279/22 |
| 5,447,397 | A | 9/1995 | Asano | 408/59 |
| 5,464,229 | A | 11/1995 | Salpaka | 279/30 |
| 5,470,084 | A | * 11/1995 | Reibetanz et al. | 279/62 |
| 5,481,949 | A | 1/1996 | Yen | 81/438 |
| 5,558,478 | A | 9/1996 | Odendahl et al. | 408/226 |
| 5,577,743 | A | 11/1996 | Kanaan et al. | 279/72 |
| 5,603,516 | A | 2/1997 | Neumaier | 279/19.5 |
| 5,669,730 | A | 9/1997 | Bidaux | 403/325 |
| 5,678,961 | A | 10/1997 | Fleege et al. | 408/239 A |
| 5,700,018 | A | 12/1997 | Bongers-Ambrosius et al. | 279/19.4 |
| 5,709,391 | A | 1/1998 | Arakawa et al. | 279/19.4 |
| 5,709,393 | A | 1/1998 | von Keudell et al. | 279/97 |
| 5,722,805 | A | 3/1998 | Giffin | 408/239 R |
| 5,749,893 | A | 5/1998 | Vidal et al. | 606/205 |
| 5,755,448 | A | 5/1998 | Kanaan et al. | 279/75 |
| 5,810,366 | A | 9/1998 | Montjoy et al. | 279/43 |
| 5,813,296 | A | 9/1998 | Hoff et al. | 81/177.85 |
| 5,820,136 | A | 10/1998 | Han et al. | 279/131 |
| 5,826,888 | A | 10/1998 | Weaver et al. | 279/23.1 |
| 5,833,405 | A | 11/1998 | Nielsen | 408/226 |
| 5,868,209 | A | 2/1999 | Wierspecker et al. | 173/213 |
| 5,881,614 | A | 3/1999 | Cheng-Tsan | 81/438 |
| 5,893,685 | A | 4/1999 | Olson et al. | 408/35 |
| 5,903,983 | A | 5/1999 | Jungmann et al. | 30/392 |
| 5,906,378 | A | 5/1999 | Nordquist | 279/4.06 |
| 5,921,562 | A | 7/1999 | Robison | 279/128 |
| 5,921,563 | A | 7/1999 | Huggins et al. | 279/131 |
| 5,951,026 | A | 9/1999 | Harman, Jr. et al. | 279/143 |
| 5,954,347 | A | 9/1999 | Buck et al. | 279/20 |
| 5,975,815 | A | 11/1999 | Zierpka et al. | 408/226 |
| 5,984,596 | A | 11/1999 | Fehrle et al. | 408/226 |
| 5,988,957 | A | 11/1999 | Wheeler | 408/239 R |
| 6,007,277 | A | 12/1999 | Olson et al. | 408/35 |
| 6,047,971 | A | 4/2000 | Harman, Jr. et al. | 279/143 |
| 6,053,675 | A | 4/2000 | Holland et al. | 408/239 R |
| 6,059,296 | A | 5/2000 | Baeder | 279/20 |
| 6,079,716 | A | 6/2000 | Harman, Jr. et al. | 279/75 |
| 6,089,798 | A | 7/2000 | Wierspecker et al. | 408/226 |
| 6,092,814 | A | 7/2000 | Kageler | 279/19.4 |
| 6,126,370 | A | 10/2000 | Wheeler et al. | 408/239 R |
| 6,135,462 | A | * 10/2000 | Robison | 279/137 |
| 6,139,241 | A | 10/2000 | Craig et al. | 414/287 |
| 6,193,242 | B1 | 2/2001 | Robison | 279/137 |
| 6,533,291 | B2 | * 3/2003 | Huggins et al. | 279/29 |
| 6,554,292 | B1 | * 4/2003 | Rohm | 279/137 |

\* cited by examiner

CHUCK HAVING QUICK CHANGE MECHANISM

CROSS REFERENCE TO RELATED APPLICATION

This application is a continuation of U.S. patent application No. 09/783,698, filed on Feb. 14, 2001, now U.S. Pat. No. 6,533,291, the entire disclosure of which is incorporated by reference herein.

BACKGROUND OF THE INVENTION

The present invention relates generally to chucks for hand, electric or pneumatic power drivers. Electric and pneumatic tool drivers are well known. Although twist drills are the most common tools on such drivers, the tools may also comprise screw drivers, nut drivers, burrs, mounted grinding stones and other cutting or abrading tools. Since the tool shanks may be of varying diameter or of polygonal cross-section, the device is usually provided with a chuck that is adjustable over a relatively wide range. The chuck may be attached to the driver spindle by a threaded or tapered bore. A variety of chucks for both hand and power drivers have been developed in the art. In an oblique jawed chuck, a chuck body includes three passageways disposed approximately 120 degrees apart from each other. The passageways are configured so that their center lines meet at a point along the chuck access that is typically forward of the chuck. The passageways constrain three jaws that are moveable in the passageways to grip a cylindrical or polygonal tool shank displaced approximately along the chuck's center axis. The chuck includes a nut that rotates about the chuck center and that engages threads on the jaws so that rotation of the nut moves the jaws in either direction within the passageways. The body is attached to the spindle of a driver and is configured so that rotation of the body in one direction with respect to the nut forces the jaws into gripping relationship with the tool shank, while rotation in the opposite direction releases the gripping relationship. The chuck may be operated by a chuck key, or the sleeve may be rotated by hand in a keyless configuration. An example of a keyless chuck is disclosed in U.S. Pat. No. 5,125,673 commonly assigned to the present Assignee and the entire disclosure of which is incorporated by reference herein. Various configurations of keyless chucks are known in the art and are desirable in a variety of applications.

SUMMARY OF THE INVENTION

The present invention recognizes and addresses the foregoing considerations, and others, of prior art constructions and methods.

Accordingly, it is an object of the present invention to provide an improved chuck for a tool driver.

This and other objects may be achieved by a chuck for use with a manual or powered driver having a drive shaft. The chuck includes a generally cylindrical body member having a nose section and a tail section. The tail section is configured to mate with the drive shaft of the driver, and the nose section has an axial bore formed therein. A plurality of jaws are disposed radially reciprocally within the body in communication with the bore. Each jaw has a jaw face formed thereon for engagement with the tool. A driver is disposed on the body member and in engagement with the jaws so that rotation and/or axial movement of the driver with respect to the body drives the jaws toward or away from the axial bore, depending on the direction of the rotation and/or axial movement. A first detent is disposed in the body in communication with the jaws. At least one of the jaws defines a catch thereon at a predetermined position on the jaw so that the catch engages the first detent when the jaws are at a predetermined position on the chuck body with respect to the axial bore.

In one embodiment of the present invention, a second detent extends into the axial bore so that a tool shank defining a predetermined cross-sectional distance deflects the second detent radially outward as the tool shank is inserted into the axial bore. The jaw faces engage circumferential gripping surfaces of the tool shank when the jaws are in such predetermined position.

In another preferred embodiment, a chuck for use with a manual of powered driver having a drive shaft includes a generally cylindrical body member having a nose section and a tail section. The tail section is configured to mate with the drive shaft of the driver, and the nose section has an axial bore formed therein. A plurality of jaws are disposed radially reciprocally within the body in communication with the bore. Each of the jaws has a jaw face formed thereon for engagement with the tool. An annular nut is axially movably disposed about the body in driving engagement with the jaws so that axial movement of the nut with respect to the body drives the jaws toward and away from the axial bore, depending on the direction of the axial movement. The nut defines a threaded outer circumferential surface. A generally cylindrical sleeve is rotatably mounted about the body and defines a threaded inner circumferential surface engaging the threaded outer surface of the nut so that relative rotation between the nut and the sleeve moves the nut axially with respect to the body. The nut and the body tail section are rotationally coupled by an axially aligned, with respect to the chuck body, slot defined on one of the nut and the tail section and an axially aligned rib defined on the other of the nut and the tail section and received by the slot.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying figures, in which.

Figure 1:
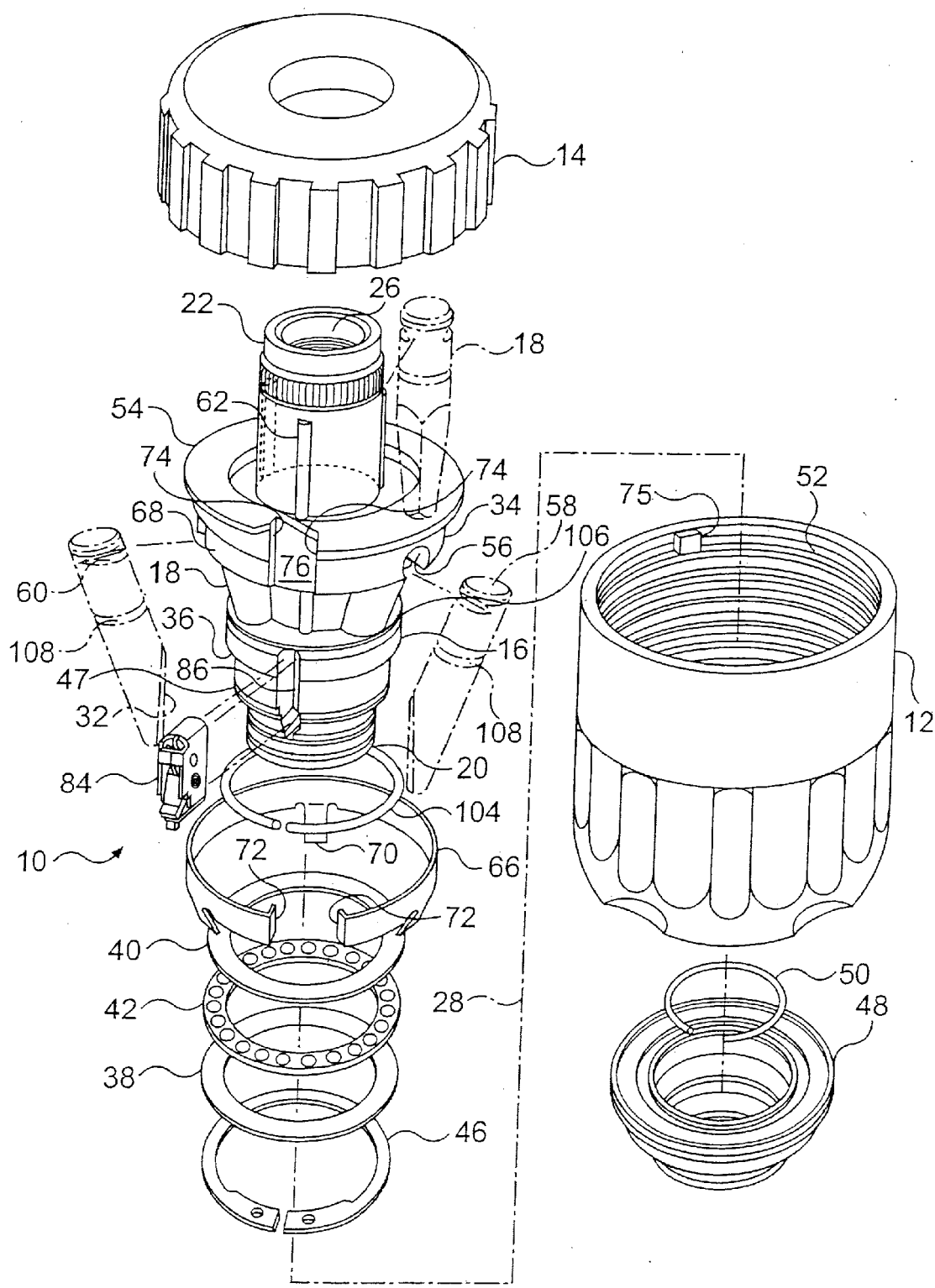
FIG. 1 is an exploded view of a chuck in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
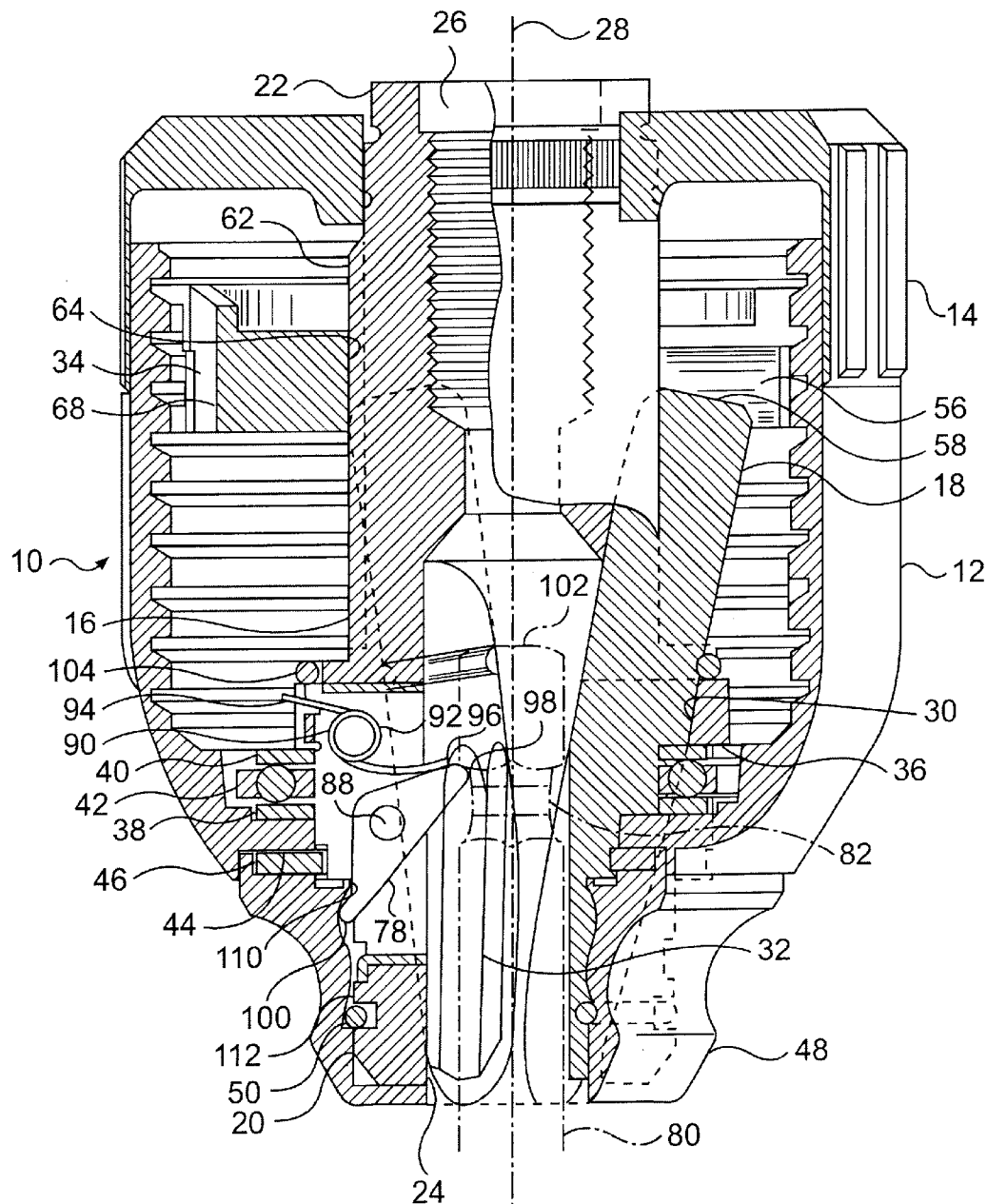
FIG. 2 is a side sectional view of the chuck as in FIG. 1.

Referring to FIGS. 1 and 2, a chuck 10 in accordance with an embodiment of the present invention includes a front sleeve 12, an optional rear sleeve 14, a body member 16, and jaws 18. Body 16 is generally cylindrical in shape and comprises a nose or forward section 20 and a tail or rearward section 22. An axial bore 24 is formed in the nose section and is somewhat larger than the largest tool shank that the chuck is designed to accommodate. A threaded bore 26 is formed in tail section 22 and is of a standard size to mate with the drive shaft of a powered or hand driver (not shown). The bores 24 and 26 may communicate at the central region of body member 16. While a threaded bore is illustrated, such bore could be replaced with a tapered bore of a standard size to mate with a tapered drive shaft or could be made integrally with the drive shaft.

Passageways 30 are formed in body member 16 to accommodate each jaw 18. Preferably, three jaws 18 are employed, and each jaw is separated from the adjacent jaw by an arc of approximately 120 degrees. The axes of passageways 30 and jaws 18 are angled with respect to chuck axis 28 but intersect the chuck axis at a common point. Each jaw has a tool engaging face 32 that is generally parallel to the chuck body axis.

Body 16 defines a shoulder 36 against which is received a bearing assembly comprised of a pair of washers 38 and 40 and a caged ball bearing ring 42 between the washers. Forward race 38 bears in an axially forward direction against a shoulder 44 of sleeve 12, and rearward axial movement of sleeve 12 on the body is prevented by shoulder 36 through the bearing assembly. The bearing assembly may comprise any suitably construction, for example of the type described in U.S. Pat. No. 5,348,318, incorporated by reference herein.

A C-clip 46 is received in an annular groove 47 in the body to secure the sleeve and the bearing assembly in the axially forward direction. A nose piece 48 is slidably received over body nose section 20 and is yieldably axially restrained by a compressible C-ring 50 as described in more detail below.

The outer circumferential surface of sleeve 12 may be knurled or may be provided with longitudinal ribs or other protrusions to enable an operator grip it securely. The sleeve may be fabricated from a structural plastic such as polycarbonate, a filled polypropylene, for example glass-filled polypropylene, or a blend of structural plastic materials. Other composite materials, such as, for example, graphite-filled polymerics could also be suitable in certain environments. Further, the sleeve may be constructed from suitable metals, such as steel. As should be appreciated by one skilled in the art, the materials from which the chuck is fabricated may depend on the end use of the power driver, and the above are provided by way of example only.

An interior surface of sleeve 12 defines female threads 52. The threads are a modified square thread formation. It should be understood, however, that any suitable thread shape or formation may be employed, for example including a modified buttress thread. The forward faces of the threads may be angled, as shown in FIG. 2, or may form straight or curved surfaces. Furthermore, the threads may define any suitable pitch, for example an eight pitch configuration along the length of the sleeve.

A driver, in this embodiment a nut 34, is slidably received over the chuck body and has a male thread 54 extending about the nut's outer circumferential surface. Thread 54 has the same pitch as thread 52 so that when thread 54 is received by thread 52, relative rotation between sleeve 12 and nut 34 moves the nut axially within the sleeve. In particular where the nut is molded, thread 54 may have sloped sides, for example at an approximately 5 degree slope, extending from the nut's outer surface to the thread's outer circumference.

Nut 34 includes three equiangularly spaced apart slots 56 extending axially through the nut that receive respective end sections 58 of jaws 18. Slots 56 are generally cylindrical in shape, and end sections 58 have cut-outs 60 on either side of each jaw so that end sections 58 are radially slidable within the nut. The interaction of slots 56 and end sections 58 axially secures the jaws to the nut, so that the jaws travel with the nut as it moves axially on the chuck body, and prevents rotation of the jaws about their axes.

It should be understood that the jaws may be secured to the nut in any suitable manner. For example, the nut may include slots that extend entirely axially through the nut, and jaw ends 58 may extend through the slots and rearward of the nut. A garter spring may extend around all three jaw ends to retain the jaws axially to the nut.

Since the jaws are received in jaw passageways 30, the connection between jaw ends 58 and slots 56 prevent the nut from rotating about body 16. The nut is also rotationally coupled to the body, however, by a slot/key arrangement between three ribs 62 extending axially along the body's tail section and three respective slots 64 that extend axially along the nut's inner circumference and that slidably receive respective ribs 62. Thus, even though the nut and body are also rotationally coupled by the jaws in the jaw passageways, the slot/key formation provides further rotational stabilization between the two components. It should be understood that the particular shapes of the slots and ribs may vary and that slots or ribs may be defined on either the nut or the chuck body.

Because the nut is rotationally coupled to the chuck body, rotation of sleeve 12 with respect to the body moves the nut axially with respect to chuck axis 28 by the cooperation between threads 52 and 54. Depending on the sleeve's rotational direction, the nut, and therefore the jaws, move axially forward or backward on the body to an opened or closed position.

As the jaws move forward toward a closed position, jaw ends 58 move radially inward within nut slots 56. Conversely, the jaw ends move radially outward toward sleeve 12 as the nut moves rearwardly in the opening direction. A guard ring 66 is received on an outer shelf surface 68 of nut 34 and covers the openings to slots 56, thereby preventing jaw ends 58 from extending radially outward of slots 56 in an extreme open position and interfering with the sleeve thread. Guard ring 66 includes three finger portions 70 that extend axially forward, and radially inward, from the openings at generally the same angle with respect to chuck axis 28 as defined by jaws 18. The guard ring is maintained in the correct rotational position by flanges 72 that grip opposing surfaces 74 of an axial slot 76 extending through the outer surface of nut 34.

Figure 3:
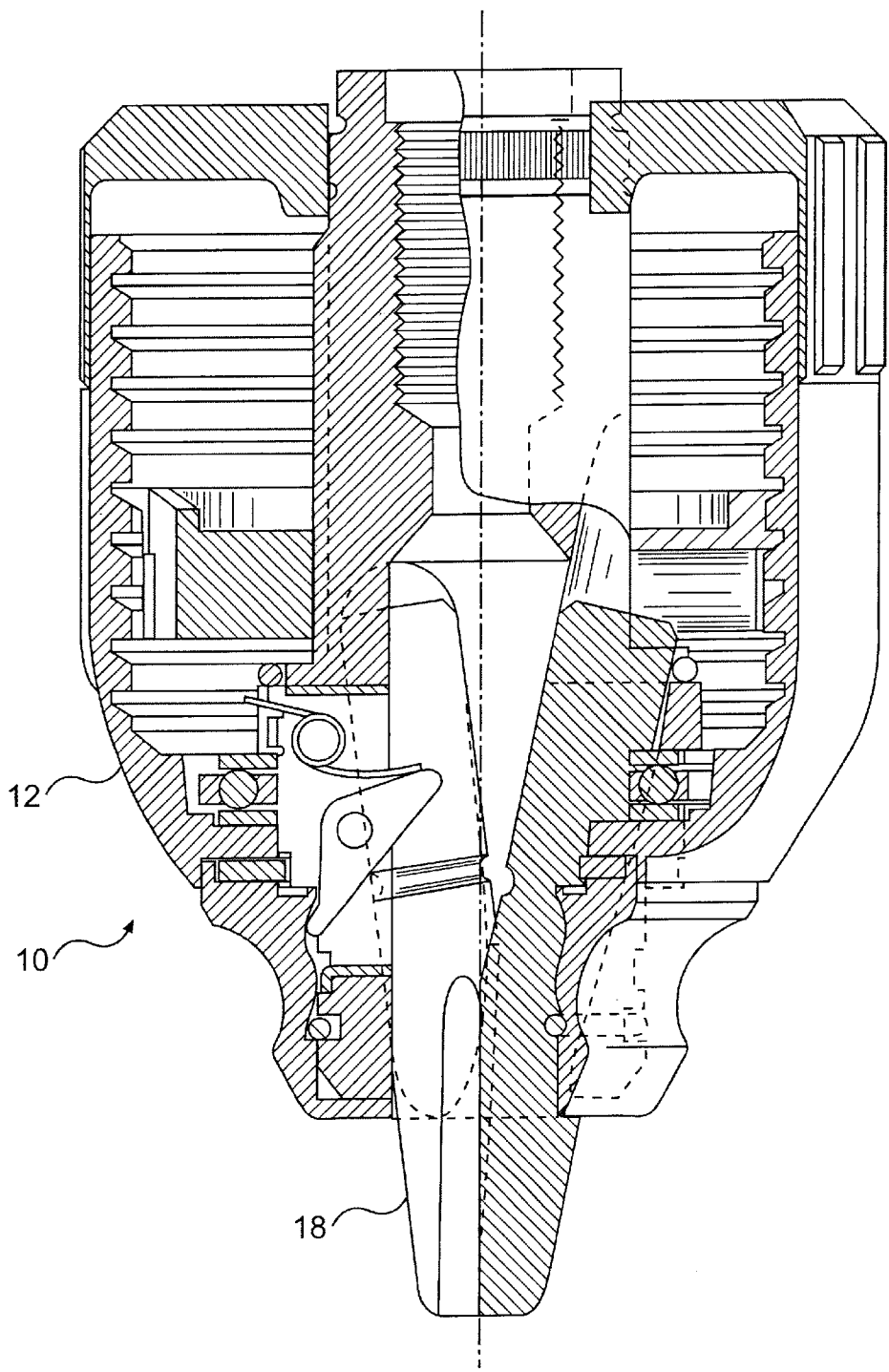
FIG. 3 is a side sectional view of the chuck as in FIG. 1.

A stop 75 may be provided at the rear edge of thread 52 so that a rear edge of thread 54 abuts the stop when the jaws reach a fully open position. A similar stop (not shown) may be provided at the front end of thread 52 to stop a forward edge of thread 54 to prevent the jaws from binding in the fully closed position (as shown in FIG. 3) when there is no tool in the chuck bore.

By rotating sleeve 12, an operator may grip and release a cylindrical or polygonal shaped tool shank through the jaws alone. The chuck may also, however, include a quick change mechanism. The quick change mechanism may include a lever 78, and a tool shank such as a shank 80 (shown in phantom in FIG. 2) may have a suitable catch, for example an annular groove 82, to receive the lever. In the embodiment shown in FIGS. 1 and 2, lever 78 is housed in a cartridge 84 pressed into an axial slot 86 extending radially through body 16 and opening into bore 24. Lever 78 is pivotally attached to the cartridge, and therefore the chuck body, at a pin 88. A spring 90 winds about a pin 92 and has a first end 94 resting against a rearward edge of cartridge 84 and a second edge 96 that rests against a rearward end 98 of lever 78 so that spring 90 biases rearward end 98 into bore 24. Due to the pivotal connection of lever 78 at 88, a forward end 100 of lever 78 is biased radially outward against an inner surface of nose piece 48.

When a tool shank 80 of sufficient cross-sectional diameter is inserted into bore 24, a leading edge 102 of the tool shank engages a forward edge of rearward end 98 and pushes rearward end 98 radially outward against the bias of spring 90 so that rearward end 98 passes over tool shank 80 as the tool shank is inserted into the bore. When the shank passes to a sufficient depth into the bore, spring 90 pushes rearward end 98 into annular groove 82. If the tool shank is pulled axially forward, groove 82 engages a rearward edge of rearward end 98, tending to pivot lever 78 about pin 88. This rotation is, however, prevented by the engagement of forward end 100 against the inner surface of nosepiece 48. Thus, the detent retains shank 80 axially in bore 24.

To secure the polygonal (in this case hexagonal) shank, the operator may insert the shank into the chuck bore so that lever 78 engages groove 82 and then rotate sleeve 12 until jaws 18 close upon the shank's flat gripping surfaces so that the jaws rotationally secure the shank. While a polygonal shank is illustrated in the figures, it should be understood that the shank may have other shapes and that the gripping surfaces may, for example, be cylindrical. Where a cylindrical shank is used, the jaws may be tightened onto the shank to provide rotational restraint.

However, the jaws may also be brought to a predetermined position prior to the shank's insertion, and the chuck may include a detent to locate the jaws in such a position. One such detent, for example a resilient O-ring or a C-shaped spring 104, is received within a groove 106 about the body's exterior surface. Groove 106 extends into the body sufficiently so that it opens into jaw passageways 30. Thus, the outer surfaces of jaws 18 extend into groove 106 so that spring 104 is biased inward against the jaw sides.

Each jaw includes a catch, for example a circumferential groove 108, at a predetermined position on the jaw so that spring 104 simultaneously engages all three jaw grooves 108 when jaw faces 32 define a circle having a diameter such that the jaw faces will engage the flat gripping surfaces of tool shank 80 when the tool shank is inserted into the bore. Thus, the jaws prevent the tool shank's rotation while lever 78 retains the shank axially. It should be understood that the catch may comprise any suitable structure, for example a raised portion on the jaw side, and that the catch configuration may vary as suitable for a given detent.

Spring 104 does not hold the jaws so securely that the operator is unable to rotate sleeve 12 once the catch and detent are engaged. That is, as the operator rotates the sleeve to move the jaws in the jaw passageways, the operator feels the engagement between spring 104 and groove 108 but is able to continue opening or closing the jaws if the operator so desires. Thus, spring 104 and grooves 108 locate the jaws for the operator when it is desired to use the chuck in a quick change configuration.

As should be recognized by one skilled in the art, the position at which grooves 108 are defined on jaws 18 depends on several factors, including the chuck's dimensions, the placement of spring 104, and the diameter by which it is desired to separate jaw faces 32. Preferably, the diameter is defined by the dimensions of a tool shank with which the chuck is expected to be commonly used, for example ¼ inches, ⁷⁄₁₆ inches, or other suitable diameter.

Once shank 80 is inserted into the bore, it may be released by pulling nosepiece 48 forward so that a cam surface 110 at the rear of the nosepiece pushes forward end 100 of lever 78 radially inward within cartridge 84. This pivots lever 78 about pin 88 so that rearward end 98 moves radially outward out of groove 82.

Lever 78 assists in retaining nosepiece 48 on the body. Cam surface 110 is sloped such that the pin's forward end 100, which is biased into the cam surface by spring 90, tends to urge the nosepiece axially rearward into its position shown in FIG. 2. Furthermore, C-ring 50 is biased radially outward against a second cam surface 112. When the nosepiece is pulled forward, ring 50 pushes outward against cam surface 112 and, when the operator releases the nosepiece, urges the nosepiece axially rearward to its position shown in FIG. 2.

It should be understood that the detents shown in FIGS. 1 and 2 are provided for purposes of example only and are not intended to limit the present invention. Instead of cartridge 84, for example, a pin or ball may be received in a slot or bore extending radially through the body at an angle with respect to chuck axis 28 so that the bore opens axially forwardly into the chuck bore. A spring in the bore biases the ball or pin forward toward and into the chuck bore so that the pin or ball is pushed back into the bore upon insertion of the tool shank but prevents the tool from being pulled out. Various quick change detents, and release mechanisms, should be understood in this art.

Further, it should be understood that the jaw gripping detent may be constructed in any suitable configuration and may be placed in any suitable position to engage the jaws. For example, referring to FIGS. 4 and 5, spring 104 is located in a groove 114 defined about an inner circumferential surface of the body within bore 24. Similarly to the corresponding groove in the embodiment shown in FIGS. 1–3, groove 114 extends into jaw passageways 30. In this case, however, the side surfaces of jaws 18 push spring 104 radially inward so that the spring is biased outward against the jaw surfaces. When the jaws reach the predetermined position where jaw faces 32 define the desired diameter, spring 104 engages grooves 108 in the jaws, thereby locating the jaws and notifying the operator that the jaws are in the desired position.

Figure 4:
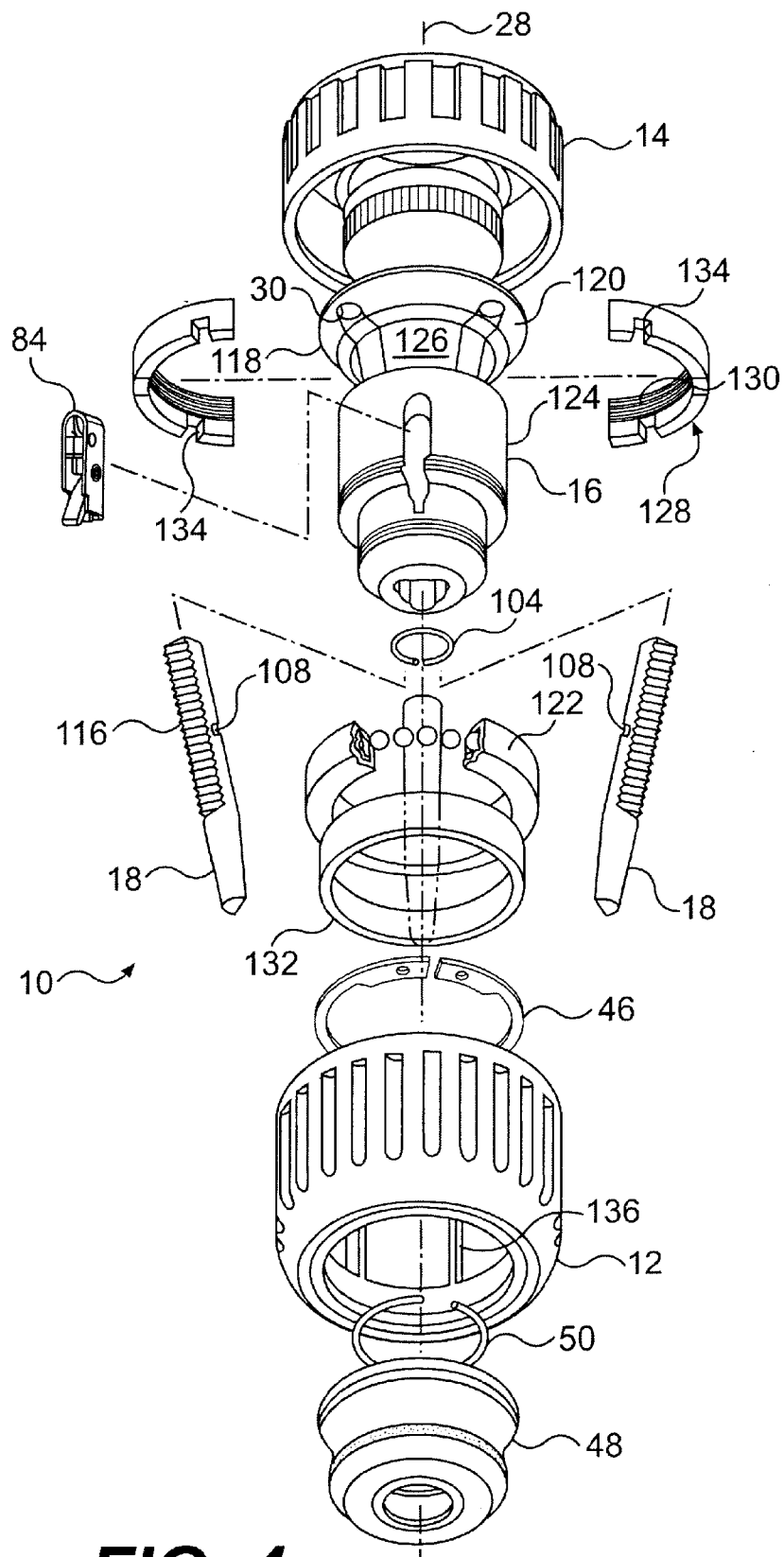
FIG. 4 is an exploded view of a chuck in accordance with an embodiment of the present invention.
Figure 5:
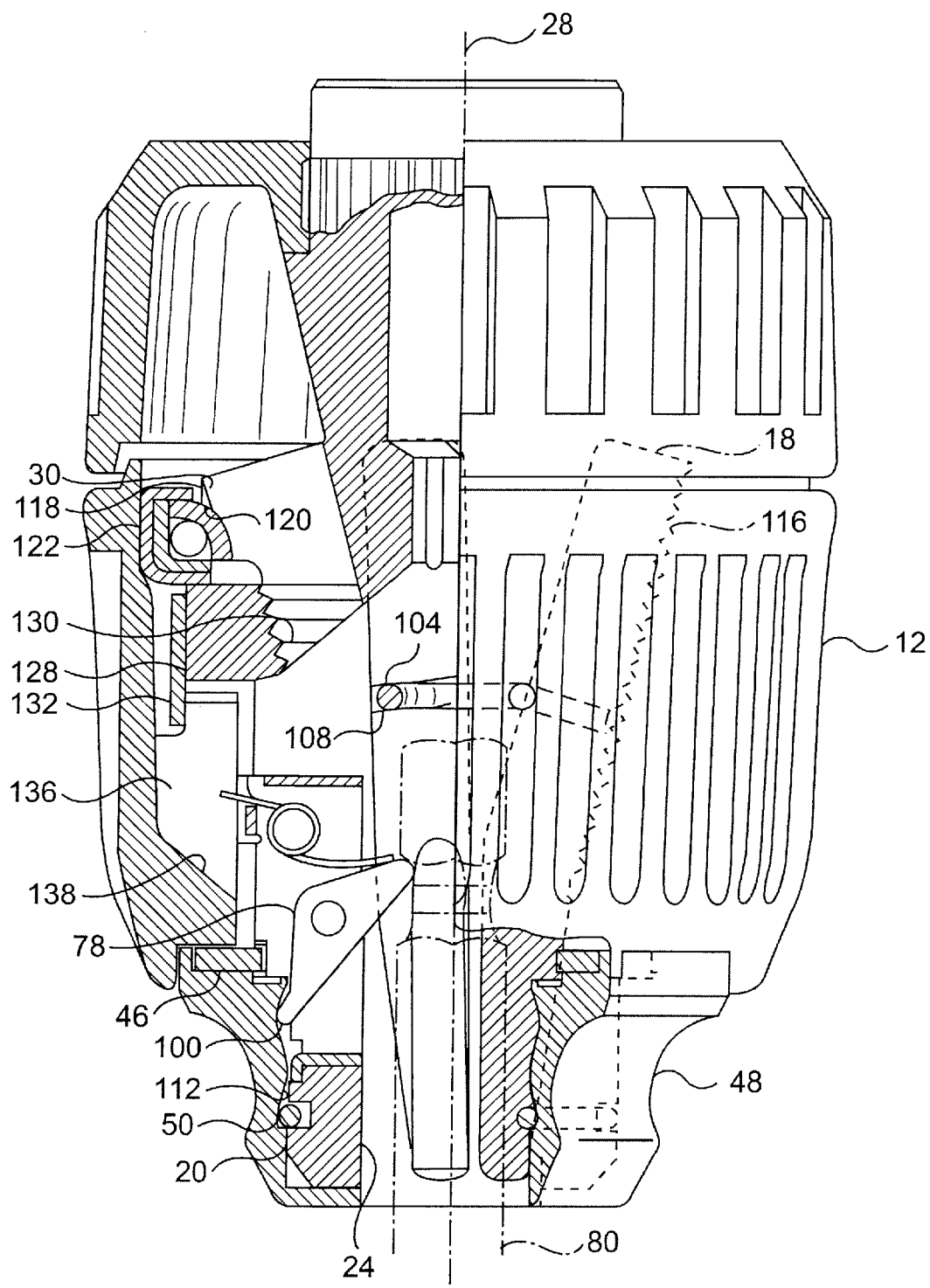
FIG. 5 is a side sectional view of the chuck as in FIG. 4.

The embodiment in FIGS. 4 and 5 also illustrates that the quick-change mechanism may be employed in any suitable chuck configuration. Body 16 is again generally cylindrical in shape and includes a nose section 20 and a tail section 22. Bore 24 is dimensioned somewhat larger than the largest tool shank that the chuck is designed to accommodate. The tail section defines a threaded bore of a standard size to mate with a drive shaft, and the front and rear bores may communicate at a central region of the chuck body. Tail section 22 may also include a knurled surface for receipt of optional rear sleeve 14 to be pressed thereon if so desired.

Body 16 defines three passageways 30 to respectively accommodate three jaws 18. Each jaw is separated from the adjacent jaw by an arc of approximately 120 degrees. The axes of passageways 30 and jaws 18 are angled with respect to the chuck center axis 28 such that each passageway axis travels through axial bore 24 and intersects axis 28 at a common point. Each jaw's tool engaging face 32 is generally parallel to axis 28. Threads 116, formed on each jaw's opposite or outer surface, may be constructed in any suitable type and pitch.

Body 16 includes a radially extending flange 118 that, in a preferred embodiment, may be integral with the body. It should be understood, however, that flange 118 and body 16 may be separate components. Jaw passageways 30 extend through flange 118 to permit retraction of jaws 18 therethrough, and the flange includes a ledge portion 120 to receive a bearing assembly 122.

A front cylindrical portion 124 of body 16 is of a greater diameter than a smaller tapered portion 126 to form a circumferential groove that receives a split nut 128 in front of bearing assembly 122. Nut 128 includes threads 130 for mating with threads 116 on jaws 18. Thus, when nut 128 is rotated with respect to the body, the jaws are moved in passageways 30 forward or backward, depending on the nut's rotational direction with respect to the body. Nut 128 receives a retaining band 132 that maintains the nut together after assembly. The nut includes drive slots 134 that receive drive ribs 136 on sleeve 12 so that sleeve 12 rotationally drives nut 60 to move jaws 18 within the passageways.

The front sleeve includes a front ledge portion 138 that bears against a C-clip 46 received in an annular groove 142 and that retains the sleeve in the axially forward direction. Nosepiece 48 is secured to the chuck body, and operates, in a manner similar to that discussed above with respect to FIGS. 1 and 2.

While one or more preferred embodiments of the present invention have been described above, it should be understood that any and all equivalent realizations of the present invention are included within the scope and spirit thereof. Thus, the depicted embodiments are presented by way of example only and are not intended as limitations of the present invention. It should be understood that aspects of the various one or more embodiments may be interchanged both in whole or in part. Therefore, it is contemplated that any and all such embodiments are included in the present invention as may fall within the literal or equivalent scope of the appended claims.

What is claimed is:

1. A chuck for use with a manual or powered driver having a drive shaft, said chuck comprising:
   a. a generally cylindrical body having a nose section and a tail section configured to rotate with said drive shaft, said nose section having an axial bore formed therein and a plurality of angularly disposed passageways formed therethrough and intersecting said axial bore;
   b. a plurality of jaws slidably received in respective said angularly disposed passageways, each of said jaws having a jaw face formed on one side thereof;
   c. a driver disposed on said body member and operatively engaged with said jaws;
   d. a generally cylindrical sleeve rotatably mounted about said body and operatively engaged with said driver so that relative rotation between said body and said sleeve drives said jaws toward or away from said axial bore, depending on the direction of said rotation; and
   e. a first detent disposed in one of said body and at least one of said jaws in communication with a catch formed on the other of said body and at least one of said jaws, wherein said catch engages said first detent when said jaw faces are at a predetermined position in said axial bore.

2. The chuck as in claim 1,
   said driver including an annular nut axially movably disposed about said body in driving engagement with said jaws so that axial movement of said nut with respect to said body moves said jaws toward or away from the axis of said axial bore, and wherein said nut defines a threaded outer circumferential surface, and
   wherein said generally cylindrical sleeve defines a threaded inner circumferential surface engaging said threaded outer surface of said nut so that relative rotation between said nut and said sleeve moves said nut axially with respect to said body.

3. The chuck as in claim 1, including
   a radially extending thrust ring axially fixed to said body and engaging said sleeve so that said sleeve transfers rearward axial force to said body through said thrust ring, and
   a bearing disposed between said thrust ring and said sleeve.

4. The chuck as in claim 2, wherein said nut and said tail section of said body are rotationally coupled by an axially aligned, with respect to said chuck body, slot defined on one of said nut and said tail section and an axially aligned rib defined on the other of said nut and said tail section and received by said slot.

5. The chuck as in claim 1, wherein said driver includes an annular nut axially fixed and rotatable with respect to said body, said nut being rotationally fixed with respect to said sleeve.

6. The chuck as in claim 5, wherein each of said jaws defines threads thereon, wherein said nut defines threads on a circumferential surface thereof, and wherein said nut threads engage said jaw threads so that relative rotation between said nut and said body drives said jaws in said passageways toward or away from the axis of said axial bore.

7. The chuck as in claim 1, wherein said first detent includes a spring disposed circumferentially on one of said body and at least one of said jaws and in engagement with the other of said body or at least one of said jaws so that said spring is biased into said catch.

8. The chuck as in claim 7, wherein said body defines an annular groove in an outer circumferential surface of said body and wherein said spring is disposed within said groove.

9. The chuck as in claim 7, wherein said body defines an annular groove in an inner circumferential surface of said body within said axial bore and wherein said spring is disposed within said groove.

10. The chuck as in claim 7, wherein at least one jaw defines an annular groove on an outer circumferential surface of said body and wherein said spring is disposed within said groove.

11. The chuck as in claim 7, wherein said catch includes a groove.

12. The chuck as in claim 1, wherein said jaw faces define a diameter of approximately 0.25 inches when said jaws are at said predetermined position.

13. The chuck as in claim 1, said chuck further including a second detent having an axially forward edge and an axially rearward edge, wherein said detent is disposed in said body so that said detent is biased into said axial bore, is radially outwardly deflectable by force applied in an axially rearward direction to said axially forward edge, and is retained against radial deflection from force applied in an axially forward direction to said axially rearward edge.

14. The chuck as in claim 13, wherein said detent extends into said axial bore so that a tool shank defining a predetermined cross-sectional distance deflects said detent radially outward as the tool shank is inserted into said axial bore and wherein said jaw faces engage circumferential gripping surfaces of the tool shank when said jaws are in said predetermined position.

15. The chuck as in claim 13, said second detent including a radial bore in said body extending from an outer circumference of said body to an inner circumference of said body.

16. The chuck as in claim 15, said second detent further including a pivotally mounted lever having a first and second end and a spring coupled to said lever, wherein said spring urges said first end of said lever into said axial bore.

17. The chuck as in claim 16, said second detent further including a cartridge that houses said lever and said spring, wherein said spring is disposed operatively between said cartridge and said first end of said lever so that said spring biases said first end of said lever into said axial bore.

18. The chuck as in claim 14, said chuck further including a nose piece axially movably disposed on said nose section of said body and about said second detent, said nose piece defining a cam surface proximate said detent so that upon movement of said nose piece to an axially forward position, said cam surface deflects said detent against said radial bias moving said detent away from the axis of said axial bore, thereby releasing the tool shank from said axial bore.

* * * * *